Patented Nov. 23, 1937

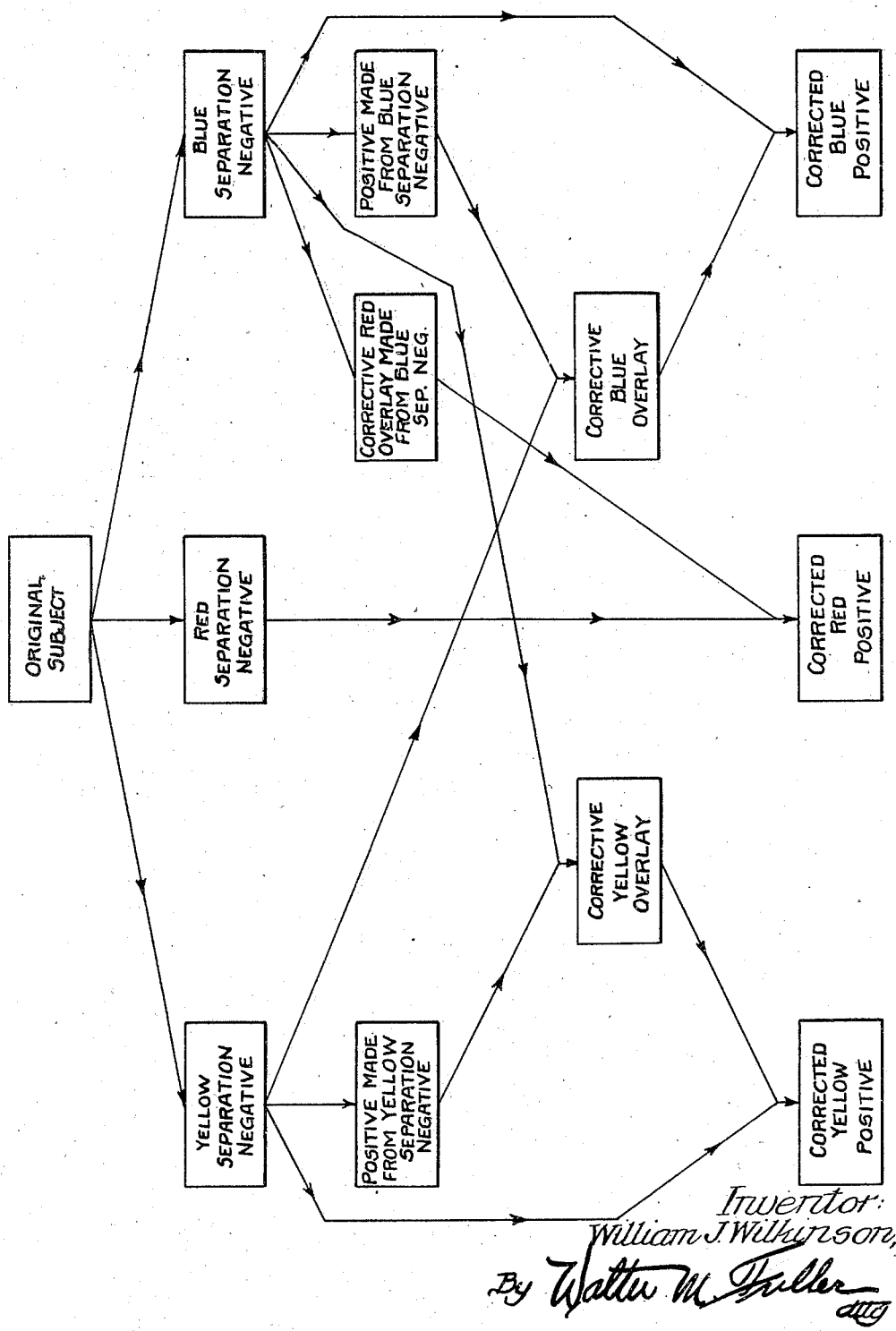

2,099,916

UNITED STATES PATENT OFFICE 2,099,916

COLOR CORRECTED PRINTING

William J. Wilkinson, Eastchester, N. Y., assignor of one-half to Miehle Printing Press and Manufacturing Company, Ch'cago, Ill., a corporation of Illinois Application November 21, 1935, Serial No. 50,867

15 Claims. (Cl. 95—5.1)

My present invention, illustrated diagrammatically in the single view of the accompanying drawing, pertains to the making of color-corrected separation-negatives and the production of printing-plates therefrom, one of the main objects thereof being to provide an improved method of color rectification coupled with a novel procedure of printing, whereby faithful reproduction of the original colored subject is attained.

The primary purpose of color separation in the printing industry is to produce from any polychromatic subject three primary color negatives—yellow, red, and blue, from which corresponding printing-plates are made, one of which negatives would represent all of the yellow in the colored subject to the exclusion of red and blue, another negative would contain all of the red in the subject to the elimination of yellow and blue, and the remaining negative would have all of the blue to the preclusion of yellow and red; this, of course, being an ideal condition which is never truly accomplished in practice by the standard known means of color separation.

In order to produce good reproductions of a subject by the three-color process of printing, practice has demanded that the yellow printing-plate shall print all of the yellow of the yellows, oranges, greens and browns and shall exclude the blues and purples; that the red printing-plate shall print all of the red of the reds, oranges, browns and purples and exclude the yellows, greens and clear blues; and that the blue printing-plate shall print all of the blue of the blues, greens and browns and exclude the yellows, oranges and reds.

To produce a yellow-separation negative according to the standard method of color-separation, the copy is placed before a camera containing a light-sensitive film or plate and between the camera lens and the copy a purple-filter is employed, the developed negative thus produced being known as the yellow-separation negative, and, this would be an exact and precise separation, segregation or isolation, if the purple-filter permitted all except the yellow rays of light to pass through it, and provided further that the emulsion of the film or plate was equally light-sensitive to all colors; but this is not the case, because the filter is not opaque to yellow only and the plate is not light-sensitive to all colors in the same degree. The specified purple-filter not only retards the action of yellow, but also, to a certain extent, blue and purple, and therefore the yellow-separation negative is not sufficiently dense in the portions representing the blues and purples.

The red-separation negative is made in a similar manner with the exception that a green-filter is substituted for the purple one, such green-filter retarding the action of the red and purple rays and also tending to retard the action of the green and blue rays, and therefore these two latter colors lack sufficient density in the red-separation negative.

The blue-separation negative is made in an analogous manner to the other two by using an orange-filter which retards the light action of blue, green and purple, and allows the yellow, orange and red rays to pass through, the blue-separation negative thus produced being usually the most correct, although the lighter shades of blue will have too much density.

In addition to the three colors mentioned above, a negative is usually made for the production of a black printing-plate which is employed to intensify the blacks in the subject and to bring out greater detail. The black-negative is made for a part of the exposure through a green-filter and for the remainder of the exposure through an orange-filter, whereby the sensitive film or plate resulting in such negative will be affected by all of the colors except black. Sometimes all three filters are used successively in making the several exposures incident to the production of the black-plate.

It is desirable or necessary that the densities of these color-separation negatives be substantially equal and that the tone gradations of each, from black to white, be practically uniform.

The ultimate use to which the negatives are to be put is also a factor, in that, if they are to be employed for lithography, they should be quite dense in the highlights and transparent in the shadows or dark areas, such negatives being termed contrasty; whereas, if the negatives are to be used for photo-engraving or half-tone gravure, they should be more soft or flat looking in that the difference between the highlight areas and the dark areas should not be as pronounced as in the case of lithography.

The difference in character in these negatives is obtained in the manner of their development which is largely influenced by the developer used and the experience of the photographer.

The yellow-separation negative, as stated, does not have enough density in the blues and purples, and, therefore, to correct this negative, it is imperative that the blues and purples be intensified by a proper overlay without destroying the values of the yellows, oranges and greens. A positive of the blue-separation negative has covering in the blues, purples and greens, and if the covering in the greens can be eliminated from such a positive, it will be the proper overlay for correcting the yellow-separation negative, and this is accomplished, in accordance with the present invention, in the following manner:—A positive is made of the yellow-separation negative, which positive, as is indicated above, has covering in yellows, oranges and greens. Such positive is used as an overlay for the blue-separation negative, the combined negative and overlay having covering in reds, oranges, yellows and greens, and a positive of this combination is made which will have a covering in blues and purples only. This last positive, which is made on a thin film, is combined as an overlay with the yellow-separation negative, the combination having the proper covering in the blues and purples without destroying the values of the reds, oranges and greens, and a final correct hemi-tone positive is made from such combination in the manner hereinafter stated, although such combination can be otherwise used to produce a printing-plate without the making of such final positive.

The red-separation negative lacks sufficient density in the greens and blues, and, therefore, to correct this negative it is necessary to reinforce the greens and blues, which is effected as a part of the new procedure by making a positive of the blue-separation negative on a thin film which has a covering in the greens and blues and combining this positive as an overlay with the red-separation negative, the resulting combination having the proper covering in the greens, blues and yellows without destroying the values of the reds, oranges and purples.

A correct red-separation hemi-tone positive is then made from this combination, although, as in the other instance, a printing-plate may be produced without first making such positive.

The blue-separation negative is ordinarily the most correct of the three, although the light-blue tones have a tendency to be lost so that if the other colors, except blue, can be given a little greater coverage, the light-blues will be brought out in more contrast. If a positive is made of the yellow-separation negative, it will have coverage in the greens, yellows and reds. Since the blue-separation printing-plate should carry the greens, it becomes necessary to eliminate the coverage in the greens, and this is done by making a positive of the blue-separation negative which has coverage in the greens, blues and purples, and combining it with the yellow-separation negative which also has coverage in the greens, blues and purples. A positive on a thin film of such combination gives coverage in the reds, oranges and yellows, and this film overlay is then combined with the blue-separation negative giving the proper densities to the reds, yellows and oranges and permitting the lighter blues a chance to come through, a correct hemi-tone blue-positive being made therefrom, although, as in the other cases, a printing-plate may be made direct from such combination.

In order to correct the black negative, which is usually not essential, it is only necessary to use the overlay which was employed to correct the yellow negative.

The corrective overlays referred to above should have proper densities which are usually approximately one-fourth the density of an ordinary transparency, the control of this density being more or less an important factor in the successful performance of this process.

The several separation-negatives having been produced in the manner stated, and, preferably, but not necessarily, of a more or less flat nature, are now used individually to make a corresponding hemi-tone positive of each, either by the direct contact method or by photographing by means of a camera.

If the direct contact method is employed, the negative with its corrective overlay, an ordinary half-tone screen preferably, but not restrictedly, of 150 lines to the inch, or any other suitable style of screen, and a light-sensitive photographic-plate are placed in a vacuum printing-frame with such a distance between the screen and the light-sensitive surface of the plate, in some cases .190 inch, that, with proper exposure to light, the resulting developed, screened positive, instead of being an ordinary half-tone positive, is what has been aptly termed a hemi-tone positive in that it interprets all of the different tones of the subject, except white, at reduced values, approximately one-half, the darkest tone of the subject being represented in such developed positive by relatively-large practically-unconnected dots, desirably in checker-board arrangement, with all tones of the subject between white and such darkest tone by dots of correspondingly graduated areas. It is not essential in all instances that all of the dots in the darkest tone be completely disconnected but the arrangement of dots should be such that the doctor-blade acting on the printing-plate made from such positive as hereinafter described has sufficient support on the plate so as not to remove any undue portion of ink from the ink-wells of the intaglio printing-plate.

In this connection it may be stated that each such positive does not truly depict the negative from which it is made, because it displays the tones of the continuous tone negative in practically disconnected dots of about one-half less value or area than they should be with the result that each such positive looks unduly shallow, thin, or more or less lifeless, as it is without the full tone contrasts present in the corresponding negative. If such positive were made with a full gradation of tones and variations in density in complete and exact conformity with those of the negative from which it is made, then the portions of the printing-plates etched therefrom presenting the deepest shadows, instead of having a large number of practically-independent, nicely-walled-in ink-wells, would have relatively large areas of one well each and of such size that there would be substantial danger of the ink-scraping doctor-blade extracting their ink contents when wiping off the excess ink from the remainder of the printing-plate.

By making each such positive such that the deepest shadows of the original subject are represented by conventional middle tones, instead of full tones, there is the assurance that the ink-wells in the printing-plate will be sufficiently separate from one another with substantial intervening walls as to preclude the doctor-blade from removing the ink from the larger wells.

It is necessary, however, to make amends for this lack of full or adequate tone amplitude or intensity throughout the positive, and, accordingly, when the intaglio printing-plate is etched through a resist made from such positive, the etching is carried to a sufficient depth in the plate to permit each well to accommodate an amount of ink greater than that merely necessary to print a dot corresponding to the exact area of the well, the result being that after each such dot is printed, its ink spreads on the print sufficiently whereby the final print is dense enough throughout to present a true and correct reproduction of the original subject in so far as its particular color is concerned.

If these hemi-tone color-separation positives are to be made by a camera instead of the direct contact method indicated, each such negative is placed before a camera, and, while properly illuminated, is photographed through an ordinary half-tone or equivalent screen, the exposure being such and the screen being so positioned with reference to the light-sensitive surface of the positive being made, that the same result is produced in the positive, this desirable dot arrangement being obtained by selecting the proper distance between the half-tone or other screen and the sensitized plate undergoing exposure and using the correct lens aperture and time for the exposure.

Regardless of which of these two procedures is followed in practising this invention, it is usually preferable, but not essential, and which has certain advantages of affording more leeway or greater latitude in the time of exposure in making the positive and of the production of sharper and more clearly defined dots and which may be accomplished by a slight change in the indicated distance between the screen and the light-sensitive film which is to form the positive, or by a slightly longer exposure, or both, to make the positive under conditions such that the whites of the subject have extremely fine dots in the positive which are capable of being entirely removed by an ordinary reducing operation, and, in eliminating these by such reduction. All of the remaining dots of the positive will be reduced a certain uniform extent, the specified reduction being controlled so as to remove the dots on the whites without eradicating the dots representing the next darker shade. In this way, all of the tone values of the picture are preserved, although the positive, when viewed by itself, as stated above, shows considerably less contrast and appears much flatter than the original subject.

This reduction step also tends to remove the fringe effect of the dots and to cause them to be more clearly defined and with sharper demarcation, these characteristics being of material importance in the subsequent step of printing with the corresponding printing-plate, inasmuch as it provides a continuous support in the heavily inked parts of the plate for the ink-wiping doctor-blade.

Each of these positives can be transferred to the metal printing-plate in any standard manner and the plate then used for printing in accordance with the intaglio process, but this is preferably carried out in the following manner in conformity with the present invention.

The surface of a copper plate which is to form this printing surface is sensitized by applying thereto a light-sensitive coating of a solution of shellac and a bichromate commonly called "cold enamel".

In color printing, it is important to secure registration of all parts of cooperating intaglio plates, this being particularly essential in the case of large subjects, and it is facilitated by placing dependence on the employment for each color of the cold-enamel light-sensitive coating on its copper printing-plate, which procedure overcomes any uncertainties which might be incident to the use of carbon tissue, but it is to be understood that the process may nevertheless be practised with the employment of carbon tissue.

This unconventional hemi-tone positive is photographically reproduced in such light-responsive cold-enamel coating, the positive having been previously stripped from its support and placed face down on the coating to assure that the final print will not be reversed right to left, whereupon such coating is developed, for example, as by the use of alcohol, leaving on the plate a coating impervious to the action of the etching medium but containing numerous free passages therethrough corresponding to the dots of the positive and through which the etching fluid has free and unimpeded access to the metal surface of the copper plate. The positive design or picture is then etched through these apertures of the resist into the surface of the underlying metal plate to the required depth, a suitable single strength only of the etching fluid being required, thus avoiding the necessity for the great care heretofore essential in etching gravure-plates.

This etching operation ordinarily requires from three to eight minutes, depending upon the solution employed, and it may be interrupted at any time to permit the plate to be washed, dried, and examined, because the resist remains in place in uninjured condition and any portions of the plate that have been adequately etched may if needed be painted over with asphalt-varnish before continuing the etching, which is then prolonged until the entire printing-plate has been etched the required amount.

It is sometimes desirable to prolong the etching of the darker portions of the plate for a greater length of time than the lighter sections in order to produce ink-wells in those parts of the surface of the plate of depth enough to retain the required quantity of ink and all the wells should be etched to a depth such that the plate can be topped and a proof taken and re-etched if necessary. The etching is terminated, however, before any substantial number of adjacent wells become connected with one another through the breaking down of their walls. Such printing-plate can be cleaned and examined at any time and re-etched as required prior to the removal of the cold-enamel, and, after the etching has progressed to the required point, the cold-enamel is removed by a strong cyanide or a lye solution and the plate is then ready for the printing-press. After a proof has been taken, the plate may be topped with ink and re-etched or corrected as needed, the ink, under these circumstances, acting as a resist.

In the finished, etched printing-plate, the various ink-wells are of different areas corresponding in position and size to the dots of the hemi-tone positive from which they are formed, but these wells are of approximately the same depth. It will be understood, therefore, that use is made of conventional, practically-disconnected or checker-board middle-tone dots in the positive and corresponding middle-tone wells in the printing-plate for the darkest shadows with regular gradations from those to dot-free or well-free whites, as the case may be, which are designed and adapted to faithfully and correctly reproduce in the print all tonal changes of that particular color in the original.

When each such inked color-plate in the usual superposed printing operation comes into contact with the paper, which need not be of a superior grade but may be of the ordinary newspaper kind, the ink of all these numerous wells is transferred to the paper and the ink of such multiplicity of printed dots spreads or expands on the surface of the paper in a manner to reproduce accurately and precisely all the tone values of that color in the initial subject. The ink-wells in the plate representing the darkest or deepest shadows are ordinarily of such size and capacity that, although they are practically unconnected, the spreading of their ink on the paper will be sufficient to cover the entire area of the printed surface corresponding to such portions of the subject, and the ink employed should be of such viscosity determined by the depth of the etching and of the separation of the wells that the dispersion of the ink on the printed surface will thus faithfully duplicate all corresponding tones and shades of the original.

By the employment of the present invention the prints are produced with exact registration for color work, with the minimum of labor, with the least complexity of operation, and with the fewest steps. These prints are outstanding and noteworthy in that a selected restricted range of tone dots is made use of to represent all tone values of the original subject, none being omitted, and, although, in the shadows, the conventional middle-tone dots are present as practically-disconnected ink-wells in the intaglio-plates, they are lost on the print through the spreading of the ink which produces a rich ink layer forming a desirable continuous tone.

Instead of following exactly the procedure set forth above, in some cases, it is feasible to strip the overlay from its support and to cause it to adhere to, and in proper register with, its corresponding negative.

Again, in place of making the hemi-tone positive directly from the negative and its associated overlay, an ordinary or continuous-tone corrected positive may be made therefrom, an additional or supplemental ordinary negative made from such positive, and the final hemi-tone positive made from such last negative.

Various other modifications may be resorted to without departure from the heart and essence of the invention as defined by the appended claims and without the loss or sacrifice of any of its material advantages.

I claim:

1. In the art of printing, making a set of yellow, red and blue separation-negatives of the subject through violet, green and orange filters respectively, making color-corrected printing-plates from said yellow and red separation-negatives, making a positive of the blue-separation negative, making an overlay from a combination of said yellow-separation negative and said positive, making a color-corrected blue-separation printing-plate from a combination of said blue-separation negative and said overlay, and printing in superposed relation with said printing-plates.

2. In the art of printing, making a set of yellow, red and blue separation-negatives of the subject through violet, green and orange filters respectively, making a first positive of the yellow-separation negative, making a yellow overlay from a combination of said first positive and said blue-separation negative, making a color-corrected yellow printing-plate from said overlay and said yellow-separation negative, making a red positive overlay from said blue-separation negative, making a color-corrected red printing-plate from said red-separation negative and said red overlay, making a third positive of said blue-separation negative, making a blue overlay from a combination of said yellow-separation negative and said third positive, making a color-corrected blue-separation printing-plate from a combination of said blue-separation negative and said overlay, and printing in superposed relation with said printing-plates.

3. The process set forth in claim 1 including the making of a black printing-plate and printing with said black printing-plate in superposed relation to that of the other printing-plates.

4. The process set forth in claim 1 including making a black corrected printing-plate of the subject and printing with said plate in superposed relation to that of said other printing-plates.

5. The process set forth in claim 2 including the making of a black printing-plate and printing with said black printing-plate in superposed relation to that of the other printing-plates.

6. The process set forth in claim 2 including making a black corrected printing-plate of the subject and printing with said black-plate in superposed relation to that of said other printing-plates.

7. The process of making a corrected blue-separation negative of the subject, consisting in making a blue-separation negative of the subject through an orange filter, making a yellow-separation negative of the subject through a violet filter, making a positive of said blue-separation negative, making an overlay from a combination of said yellow-separation negative and said positive, and combining said blue-separation negative and said overlay to form a corrected blue-separation negative.

8. In the art of printing, making a set of yellow, red and blue separation-negatives of the subject through violet, green and orange filters respectively, making color-corrected hemi-tone intaglio printing-plates from said yellow and red separation-negatives in which the solids are represented in substantially a checker-board arrangement of ink-wells, making a positive of the blue-separation negative, making an overlay from a combination of said yellow-separation negative and said positive, making a color-corrected blue-separation similar hemi-tone intaglio printing-plate from a combination of such blue-separation negative and said overlay, and printing in superposed relation with said printing-plates, each of said hemi-tone printing-plates having all the tones of the kindred tones of the subject but at substantially less values.

9. The process set forth in claim 3 in which said reduction in tone-values is approximately one-half.

10. The process consisting in making a yellow-separation negative of the subject through a violet filter, making a color-corrective overlay for said yellow-separation negative, making a red-separation negative of the subject through a green filter, making a color-corrective overlay for said red-separation negative, making a hemi-tone yellow positive from said yellow-separation negative and its overlay, making a hemi-tone yellow intaglio printing-plate from said yellow positive, making a hemi-tone red positive from said red-separation negative and its overlay, making a hemi-tone red intaglio printing-plate from said red positive, making a blue-separation negative of the subject through an orange filter, making a positive of said blue-separation negative, making a color-corrective overlay for said blue-separation negative from a combination of said yellow-separation negative and said last-mentioned positive, making a hemi-tone blue positive from said blue-separation negative and its said overlay, making a hemi-tone blue intaglio printing-plate from said hemi-tone blue positive, each of said hemi-tone positives being made by spacing a screen in front of a light-sensitive photographic plate at such a distance therefrom and exposing said plate to light through said screen and the corresponding negative and its overlay for such a period of time, that the exposed plate, when developed, will interpret the different tones of the subject, except white, at reduced values, the darkest tone of the subject being represented in the developed positive by relatively-large practically-unconnected dots and all tones of the subject of the corresponding color between white and said darkest tone by dots of correspondingly graduated areas, and printing in superposed relation in the different colors with said intaglio printing-plates, the ink-wells of which carry sufficient ink to spread on the print.

11. The process set forth in claim 10 in which said reduced tone-values in said positives and their corresponding printing-plates are substantially one-half that of the subject.

12. The process consisting in making yellow-separation, red-separation and blue-separation negatives of the subject through violet, green and orange filters respectively, making a positive from said yellow-separation negative, making a yellow overlay for said yellow-separation negative from said blue-separation negative and said positive, making a hemi-tone yellow-positive from said yellow-separation negative and said yellow overlay, making a hemi-tone yellow intaglio printing-plate from said hemi-tone yellow positive, making a red overlay positive from said blue-separation negative, making a hemi-tone red positive from said red-separation negative and said red overlay, making a hemi-tone red intaglio printing-plate from said hemi-tone red positive, making a positive from said blue-separation negative, making a blue overlay from a combination of said yellow-separation negative and said last-mentioned positive, making a hemi-tone blue-separation positive from said blue-separation negative and said blue overlay, making a hemi-tone blue intaglio printing-plate from said hemi-tone blue positive, and printing in superposed relation in the different colors with said printing-plates, each of said hemi-tone positives being made by spacing a screen in front of a light-sensitive photographic-plate at such a distance therefrom and exposing said plate to light through said screen and the corresponding color-separation negative and its overlay for such a period of time that the exposed plate, when developed, will interpret all the different tones of that color of the subject, except white, at reduced values.

13. The process set forth in claim 8 including the making of a black hemi-tone printing-plate and printing with said black printing-plate in superposed relation to that of the other printing-plates and in which said reduction in tone values is approximately one-half.

14. The process set forth in claim 8 including making a black hemi-tone corrected printing-plate of the subject and printing with said plate in superposed relation to that of said other printing-plate and in which said reduction in tone values is approximately one-half.

15. In the art of color intaglio printing, the steps of making a color-separation negative of the subject for each of a plurality of its colors using appropriate filters, making corrective overlays for such of said negatives as require them, registering each said overlay with its corresponding negative, making a photographic hemi-tone positive-transparency from each such negative and its overlay, if any, in each instance by spacing a screen in front of a light-sensitive photographic-plate at such a distance therefrom and exposing said plate through said screen to light controlled by the negative for such a period of time, said space and exposure both being sufficiently less than would produce an ordinary half-tone positive-transparency with the other conditions the same, that the exposed plate, when developed, will represent the solids if any, of the corresponding color of the subject at substantially one-half tone-value by relatively-large practically-unconnected dots in approximate-checkerboard design and will represent all lesser tones of that color of the subject by dots of corresponding lesser areas, developing said exposed plate to produce a positive-transparency having said characteristics, all of said dots being of substantially the same density, making intaglio printing-plates from said transparencies photographically and by etching, thereby providing the surface of each such printing-plate with ink-wells corresponding approximately to the dots of the correlated transparency, and printing the subject in the several colors by said printing-plates with ink which when applied to paper spreads to provide prints of the full tone value of the original subject.

WILLIAM J. WILKINSON.